INVENTOR.
FRANK H. CHAMBERS
& GAIL B. MOATS
BY MAHONEY MILLER & RAMBO ATTY'S.

INVENTOR.
FRANK H. CHAMBERS
& GAIL B. MOATS
BY
MAHONEY MILLER & RAMBO ATTY'S.

United States Patent Office 3,004,580
Patented Oct. 17, 1961

3,004,580
MULTI-PLY TIRE REPAIR UNIT
Frank H. Chambers and Gail B. Moats, Johnstown, Ohio, assignors to Technical Rubber Company, Inc., Johnstown, Ohio, a corporation of Ohio
Filed July 19, 1960, Ser. No. 43,890
3 Claims. (Cl. 152—367)

This invention relates to a multi-ply tire repair unit known in the trade as a section tire repair unit. It has to do, more particularly, with a patch for reinforcing injured pneumatic tire casings and which includes a plurality of ply members disposed in superimposed relationship and an underlying layer of cushion gum which is adapted to be vulcanized to bind the ply members to the tire casing. The ply members are formed of rubberized cord and in each ply the cord extends in one direction only, the plies usually being in pad or strip form with the cord extending longitudinally thereof and the plies being disposed in crossed angular relationship. When vulcanized in place in the tire casing, the layer of cushion gum extends outwardly beyond the area of the superimposed ply members to bond them to the tire casing.

Difficulty has been encountered in this type of tire repair unit after it has been vulcanized by heat and pressure in position in the tire casing. This difficulty has been caused by the cushion gum or unreinforced rubber layer extending beyond the cord plies cracking or breaking at the ends or edges of the cord plies where they terminate with the extended layer of cushion gum and which are commonly referred to in the art as tab ends. The cracks or breaks form in the extended unreinforced rubber at the extremity of the cords in the tab ends. The result is that the ends or edges of the cord ply members, pads or strips, work loose from the tire casing and the repair or patch unit subsequently fails. The cracking or breaking in the unreinforced extended rubber at the extremities of the cord members is due to a difference in flexing of the cord plies in the tire casing in the areas covered by the cord members of the repair and the areas covered only by the extended rubber of the repair.

This invention provides an arrangement for overcoming the difficulties of this type of patch or repair unit vulcanized in position in a pneumatic tire casing. According to this invention, the breaking or cracking in the extended rubber of the repair unit at the extremities of the cord-reinforcing members of the repair is prevented by the use of rubberized reinforcing strips. These strips are formed of rubberized cloth which has reinforcing cords extending both longitudinally and transversely so that it will have tensile strength in both directions. The rubber in these strips is cushion gum which can be vulcanized by methods well-known in the art. These reinforcing strips are positioned at the extremities of the cord members within the tab ends of the repair, crosswise of the cords therein, and extend over onto the underlying and extended cushion gum layer. Thus, each reinforcing rubberized cloth strip extends across the extremity of the tab end and projects outwardly from such extremity over the layer of unreinforced rubber or cushion gum. When the unit is vulcanized in the tire casing, each reinforcing cloth strip, therefore, serves as a reinforced connecting means between the extremities of the cords within the tab ends and the inner cord of the tire casing through the extended rubber layer to prevent cracking or breaking at such extremities, thereby assuring uniformity in flexing of the cord members in the tab ends with the cord members enclosed in the tire casing.

Preferred embodiments of this invention are illustrated in the accompanying drawings and in these drawings:
FIGURE 1 is an isometric view, partly cut away, showing a complete repair unit according to this invention with layers thereof peeled apart for purpose of illustration.

Figure 1:
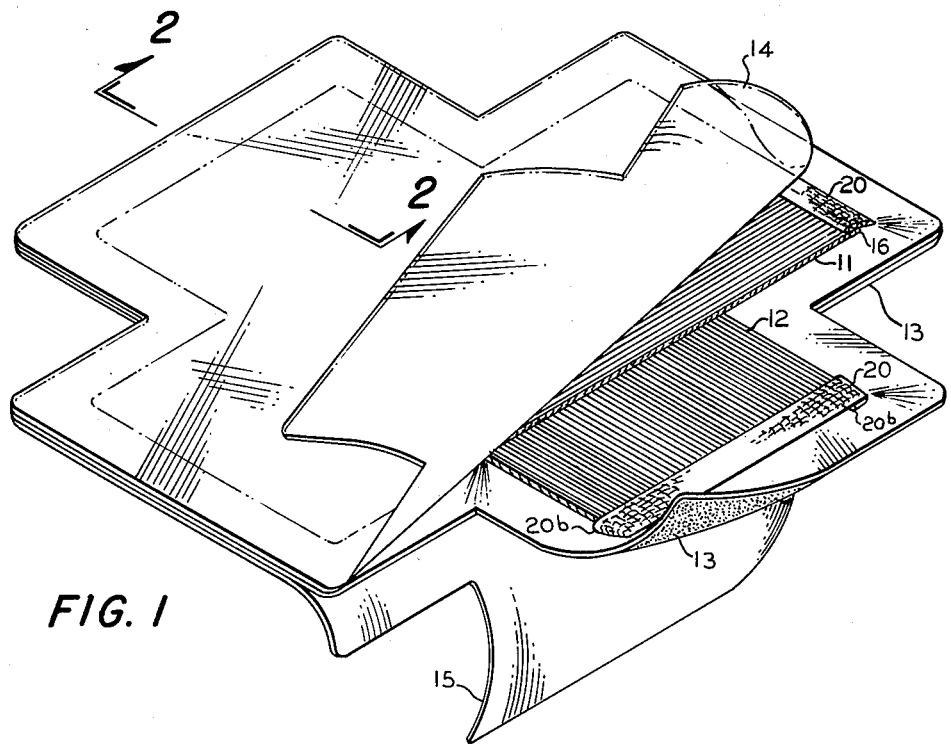
Figure 2:
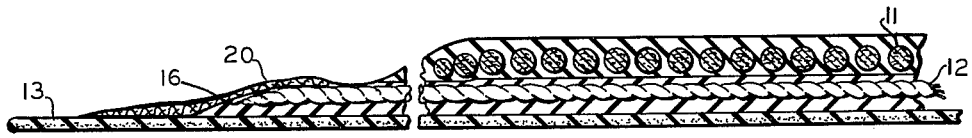
FIGURE 2 is a partial sectional view taken transversely through a portion of the unit of FIGURE 1 substantially at the location indicated by the line 2—2 of FIGURE 1, but with the protective films removed for clarity.

With reference to the drawings, there is illustrated in FIGURES 1 and 2, a tire repair unit or patch according to this invention which embodies the superimposed crossed cord ply members 11 and 12, an underlying and extended layer of cushion gum 13, and respective upper and lower protective covers 14 and 15. The latter two covers may be of plastic film, paper or other suitable material, and have no function in the actual operation of the repair unit, being provided merely to protect the upper and lower surfaces of the repair unit from contact with other surfaces and from dirt. For clarity, the protective films 14 and 15 are removed from the unit in FIGURE 2. The repair unit is adapted to be vulcanized under heat and pressure or by other means known in the art into a pneumatic tire casing illustrated at T in FIGURES 3 and 4 over an injury opening I therein to be repaired. This tire casing may be of the tube or tubeless type.

The cord plies 11 and 12 are of rubberized cord and are similar to the cord plies of a tire. Each cord ply 11 or 12 has the cords therein extending in one direction only. In the drawings, the cord plies are shown as being of strip or rectangular form and the cords are shown extending longitudinally thereof but it is to be understood that the plies may be in the form of square pads or in other forms. The cord ply 11 is placed on the ply 12 in crossed relationship thereto, so that the cords in the two plies preferably extend substantially at right angles to each other but may be in other angular relationship. Thus, in this example there are four projecting tab ends or extremities on the cord ply arrangement, each extremity being indicated at 16.

The crossed plies are positioned on the underlying layer of cushion gum 13 which underlies the complete area of the crossed plies and extends beyond such area in all directions and, in fact, will project therefrom a greater distance after being positioned and vulcanized in the tire casing. The repair of patch unit, at the time it is positioned in the tire casing, may be in an uncured or semi-cured state. When in the uncured state, the cord ply members 11 and 12 and the cushion gum layer 13 will be tacky and will adhere together. The assembly can be inserted in the tire and vulcanized in position, at which time the cushion gum layer 13 and the cord plies 11 and 12 will all be vulcanized together and to the tire casing.

In a semi-cured state, the cord plies 11 and 12 are superimposed and vulcanized together. Then they are positioned on the uncured layer 13 of cushion gum and vulcanized rubber cement may be used between the cord ply assembly and the cushion gum to cause them to more effectively adhere. After positioning in the tire casing, the semi-cured unit is cured in position so that the cushion gum will cure and bond the cord ply assembly to the tire casing. Each vulcanizing operation may be performed in a suitable press or mold with heat and pressure or by other methods well-known in the art.

On each tab end or extremity 16 of the cord plies 11 and 12 a reinforcing rubberized cloth strip 20 is mounted and extends transversely at the ends of the cords in the cord ply strip at right angles to such cords. This reinforcing strip has cords extending in both directions therein, preferably substantially at right angles to each other. It is preferred that the reinforcing strip be of woven cloth which has been impregnated with suitable rubber that vulcanizes at the same time that the cord plies 11 and 12 are vulcanized. By having the cords in the strips 20 extending in both directions, the reinforcing strip has tensile strength in two directions, namely laterally and longitudinally. The tensile strength of this fabric or cloth should, however, be less than that of the fabric of the tire. These reinforcing strips 20 may, but not necessarily, have their ends tucked underneath the tab ends of cord plies 11 or 12 on which they are mounted, as shown at 20b in FIGURE 1.

Figure 3:
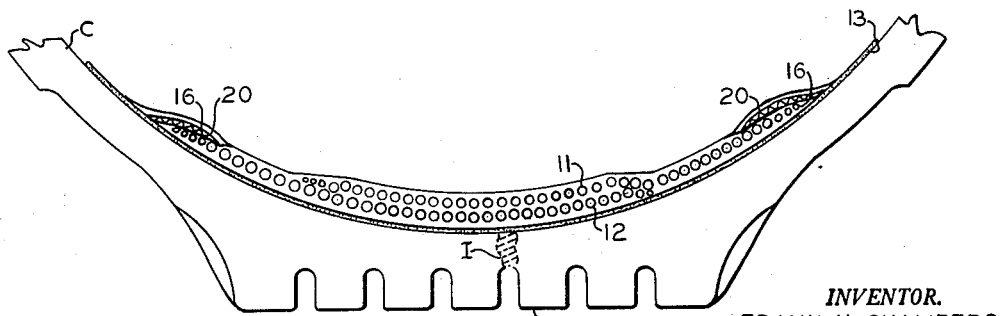
FIGURE 3 is a sectional view of the repair unit taken along line 3—3 of FIGURE 4, showing it positioned in a tire casing, a portion of which is indicated schematically.
Figure 4:
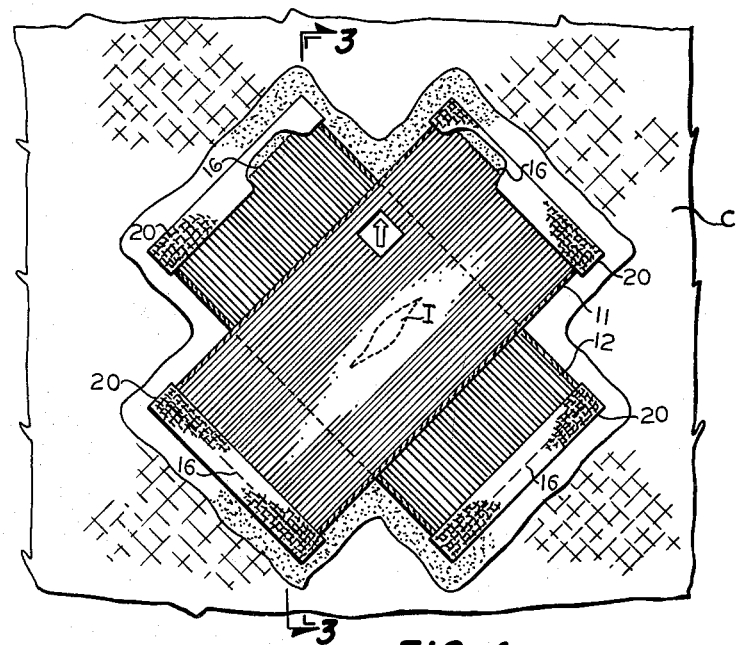
FIGURE 4 is a face view, partly cut away, of the repair unit which has been vulcanized in a tire casing, a fragment of which is illustrated schematically.
Figure 5:
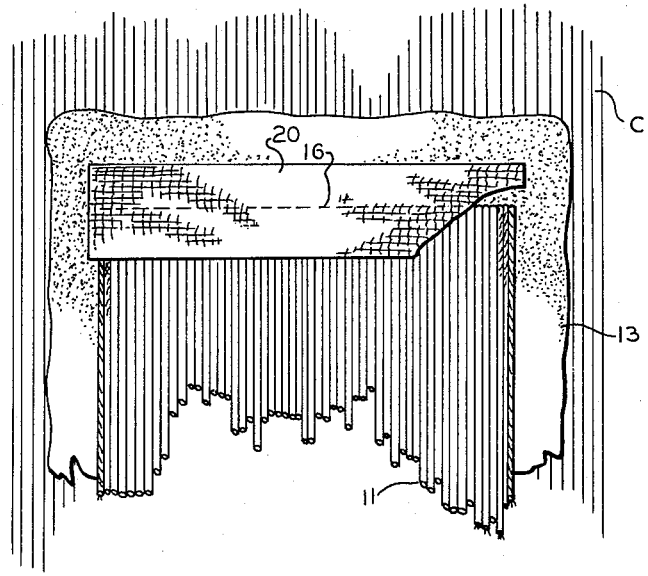
FIGURE 5 is a schematic plan view, partly cut away, of one of the tab ends of the repair unit shown in FIGURE 4, showing the relative directions of reinforcing cords in the various members.

The repair unit, after removal of the protective films or covers 14 and 15, is positioned in the tire casing with the cushion gum layer 13 in contact with the inner surface of the tire casing C and over the injury opening I, as shown in FIGURES 3 and 4. An arrow A may be provided on the uppermost cord ply to indicate that the unit should be mounted with the arrow extending toward the bead of the tire so that when the unit is thus mounted, the cords of the two plies 11 and 12 will extend in substantially the same directions as the cords in the corresponding plies of the tire. The directions of these cords relative to those in the tire casing are illustrated diagrammatically in both FIGURES 4 and 5. Although the cords in the ply members are shown extending in the same directions as the cords in the tire casing, this is not absolutely essential though it is desirable. However, the cords of the ply members should extend in the same general directions as the corresponding ones in the tire casing. The repair unit is vulcanized in place in a press with heat and pressure or by other methods and this will cause the cushion gum layer 13 to spread out even farther beyond the area of the overlying cross-shaped cord ply strip arrangement; as shown in FIGURE 4. As shown in FIGURES 3 and 4, the reinforcing strips are positioned at the extremities of the cord members within the ends of the cord ply strips 11 and 12 and crosswise of the cord members and each will extend from the cord ply which carries it over onto the extended spread cushion gum layer. Each reinforcing strip will serve as a connecting means between the end of the cord ply strip and the inner ply of the tire through the extended layer of cushion gum which carry it and will prevent cracking and breaking in the vulcanized cushion gum at the extremity of the cord members.

It has been determined that breaking or cracking in the extended unreinforced rubber at the extremities of the cords in the tab ends of the ply members is due to differences in flexing of the cord plies in the tire casing in the areas covered by the cord members of the repair unit and the areas covered only by the extended rubber of the repair unit. With prior art repair units, the flexibility is greater beyond the ends of the cord members of the ply strip in the extended vulcanized cushion gum layer. This difference in flexibility causes the trouble at the end of the cord ply. However, it has been found in actual practice with our repair unit that the difficulty is overcome by the use of the woven cloth reinforcing strips according to this invention which extend transversely of the cords in the plies and extend from the tab end of the ply strip which carries it over the ends of the cord members thereof onto the extended vulcanized rubber. This reinforcing connector strip serves to graduate the shock from the cord ply strip to the tire casing by stretching. The cloth must have sufficient tensile strength both in a lateral and longitudinal direction that it will tie together the flex of the cord plies and the different flex of the inner ply of the tire under the extended rubber which extends beyond the extremities of the cord members of the plies, thereby assuring uniform flexing of the cord members in the tab end and the inner ply of the tire. As indicated above, the tensile strength of the reinforcing strip should be less than that of the cord of the tire fabric.

Figure 6:
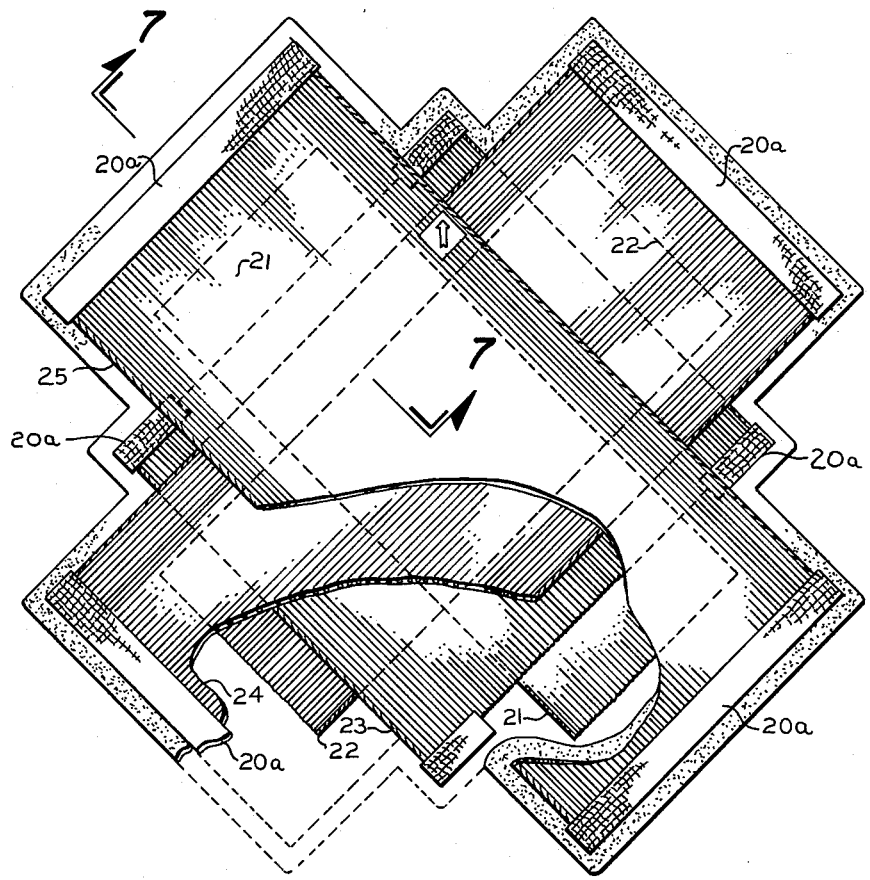
FIGURE 6 is a plan view, partly cut away, of a repair unit embodying this invention which is similar to FIGURE 1 but includes a greater number of superimposed cord ply members.
Figure 7:
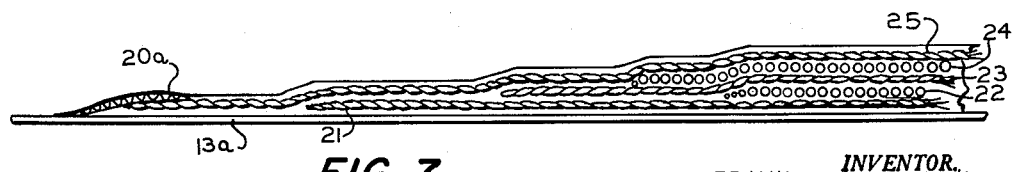
FIGURE 7 is a partial sectional view of the unit of FIGURE 6 taken along a position indicated by the line 7—7 of FIGURE 6 but with the protective films removed for clarity.

As previously indicated, the repair unit may include more than two superimposed cord ply members. However, for the extremities of each cord ply it is desirable to provide a reinforcing rubber-impregnated cloth strip according to this invention. Thus, in FIGURES 6 and 7 there is shown a repair unit which has five cord ply strips 21, 22, 23, 24 and 25 arranged in criss-crossed relationship and mounted on an underlying layer 13a of cushion gum which is of greater area than the combined cord plies and extends in all directions outwardly beyond the cord ply assembly. On each exposed extremity of these ply strips, a reinforcing cloth strip 20a is provided. Each of these strips as shown in FIGURE 6 extends cross-wise of the cord members in the tab end of the cord ply on which it is disposed. These reinforcing cloth strips 20a will function in the same manner as the strips 20.

It will be apparent that this invention provides reinforcing connecting means over the joints between the cord plies and the extended layer of rubber in a patch of the type described. This reinforcing connecting means will, in the repair unit vulcanized in the tire, prevent cracking or breaking in the vulcanized extended rubber at the ends of the cord members of the cord plies. Preferably about half of the reinforcing strip overlaps the end of the cord ply which carries it and the other half extends over onto the vulcanized rubber of the repair unit.

According to the provisions of the patent satutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A tire repair unit comprising a plurality of rubberized cord plies in the form of strips with the cords thereof extending longitudinally only from one end extremity to the other of the strips, said strips being disposed in crossed superimposed relationship with their cords arranged substantially at right angles to each other to provide a superimposed crossed area and projecting tab ends, an underlying layer of unreinforced vulcanizable rubber which extends outwardly beyond said crossed strips in all directions, and reinforcing and connecting members positioned on said tab ends and extending over the extremities thereof onto the adjacent extending portion of the vulcanizable rubber, said members being in the form of rubber impregnated strips of woven cloth fabric which extend transversely of said tab ends and the cords in said strips, said fabric having cords extending in two directions substantially at right angles so that the cords thereof extend both in the same direction as the cords in said strips and transversely thereof.

2. A tire repair unit comprising a plurality of rubberized cord plies with the cords thereof extending in one direction only from one end extremity to the other, said cord plies being disposed in crossed superimposer relationship with their cords arranged at an angle to each other to provide a superimposed crossed area and projecting tab ends, an underlying layer of unreinforced vulcanizable rubber which extends outwardly beyond the extremities of said tab ends, and reinforcing and connecting members positioned on said tab ends and extending over the extremities thereof onto the adjacent extending portion of the vulcanizable rubber, said members being in the form of rubber impregnated strips of fabric which extend transversely of said tab ends and the cords in said plies and which have cords extending in two directions in angular relationship.

3. A repaired tire casing in which the casing is of the multiple ply type having reinforcing cords and in which an injury has occurred, a repair unit vulcanized in position in the tire casing over the injury, said repair unit comprising a plurality of rubberized cord plies with the cords thereof extending in one direction only from one end extremity to the other, said cord plies being disposed in crossed superimposed relationship with their cords arranged at an angle to each other to provide a superimposed crossed area and projecting tab ends, an underlying layer of unreinforced rubber which extends outwardly beyond the extremities of said tab ends and is vulcanized to said inner ply of the tire casing, and reinforcing and connecting members positioned on said tab ends and extending over the extremities thereof onto the adjacent extending portion of the unreinforced rubber, said members being in the form of rubber impregnated strips of fabric which extend transversely of said tab ends and the cords in said plies and which have cords extending in two directions in angular relationship, said reinforcing and connecting members serving to connect the tab ends of the cord plies to the inner ply of the tire casing through the extended rubber to assure uniformity of flexing of the cord members in the tab ends of the cord plies and the inner ply of the tire casing, the tensile strength of the reinforcing and connecting members being less than that of the cord of the tire fabric and some of the cords therein extending at an angle to the inner ply of the tire casing.

References Cited in the file of this patent

UNITED STATES PATENTS

| | | |
|---|---|---|
| 1,518,466 | Stevenson | Dec. 9, 1924 |
| 2,057,797 | Springer | Oct. 20, 1936 |